Patented Nov. 10, 1925.

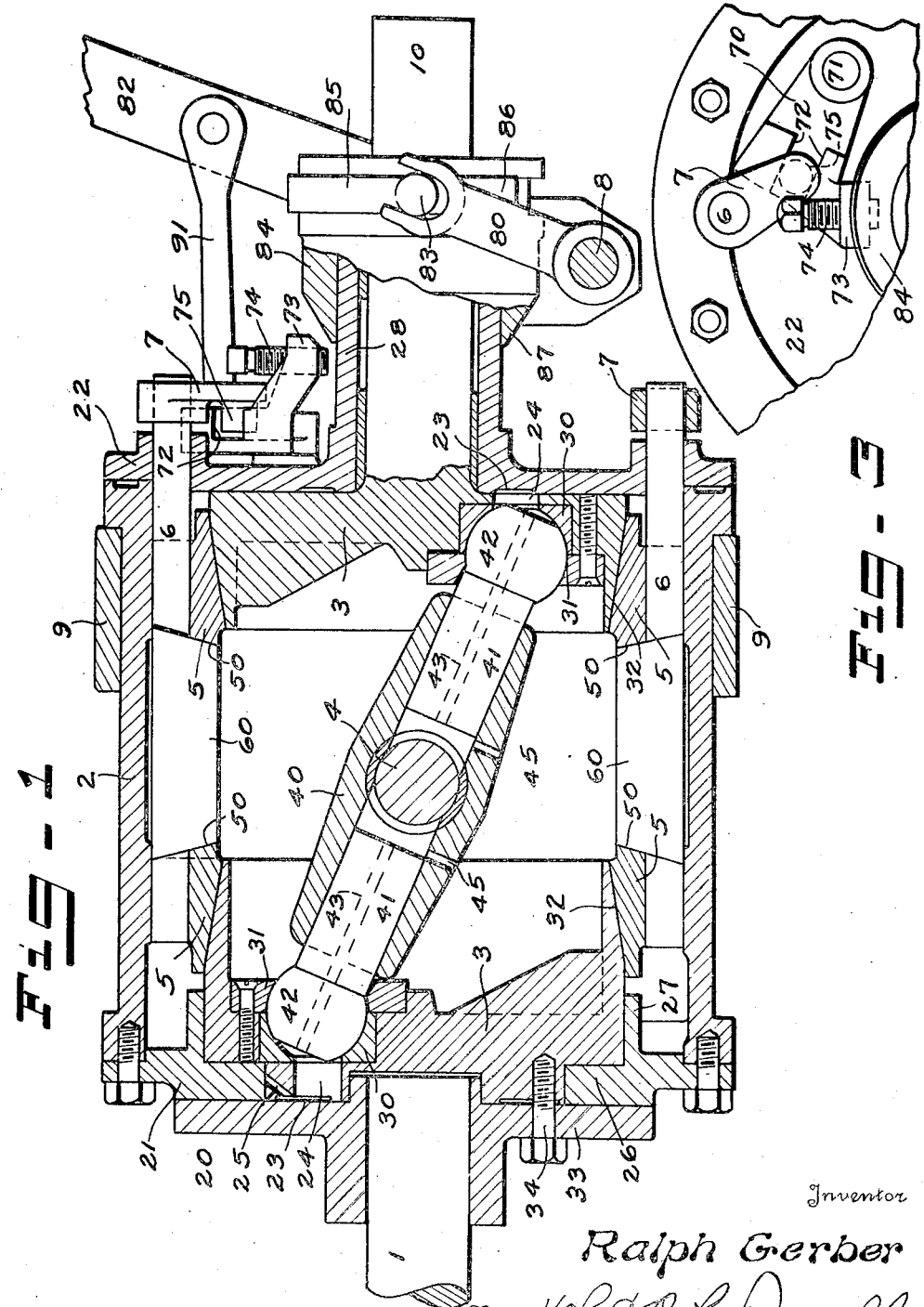

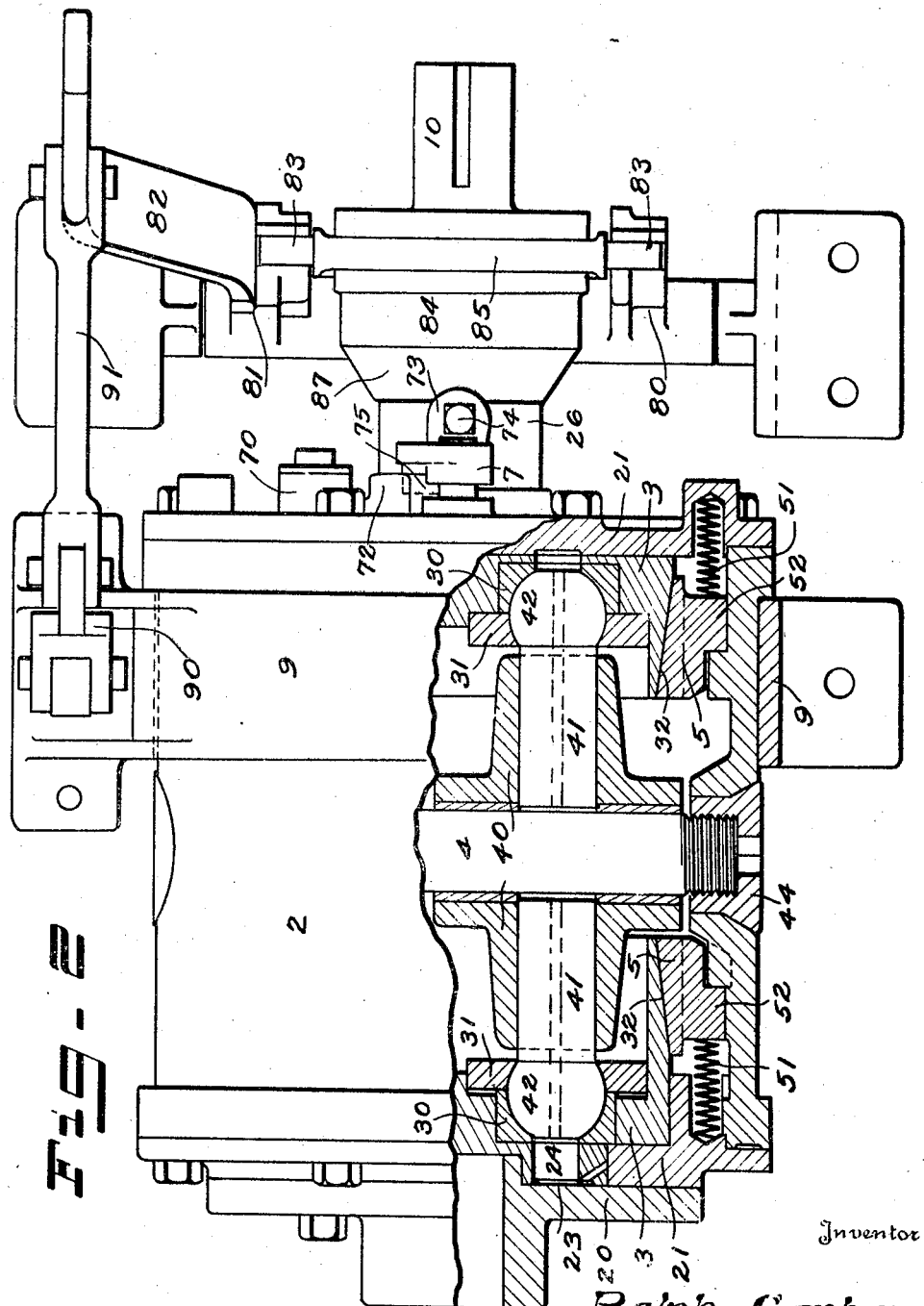

1,561,150

UNITED STATES PATENT OFFICE.

RALPH GERBER, OF RAYMOND, WASHINGTON, ASSIGNOR TO AMERICAN MANUFACTURING & SALES CO., OF RAYMOND, WASHINGTON, A CORPORATION OF WASHINGTON.

REVERSING GEAR.

Application filed June 11, 1924. Serial No. 719,311.

*To all whom it may concern:*

Be it known that I, RALPH GERBER, a citizen of the United States of America, and resident of the city of Raymond, in the county of Pacific and State of Washington, have invented certain new and useful Improvements in Reversing Gears, of which the following is a specification.

My invention relates to reversing gears of a particular type of construction, namely, a type in which the reversing mechanism contains no toothed gears, but only permanently connected cranks and levers with cooperating friction devices.

The object of my invention is to supply an improved type of reversing gear which, by reason of the use of friction surfaces between the parts, may be reversed without necessity for either of the two driving parts connected thereby coming to a complete stop.

A further object of my invention is to improve upon the details of construction of reversing devices of this type, whereby they may be caused to act more smoothly and also whereby the same may be condensed into a smaller space.

My invention consists of certain novel features of construction which will be hereinafter described and illustrated in the drawings, the novel features of the same upon which I desire to secure a patent being defined in the claims.

In the accompanying drawings I have shown my invention embodied in the special details of construction which I now prefer to use.

Figure 1 is a longitudinal section across my device.

Figure 2 is a view taken at right angles to Figure 1, in which a portion only of the casing and the operating mechanisms are shown in section.

Figure 3 is a detail showing an end view of a portion of the controlling mechanism which is mounted outside of the enclosing casing.

My present invention is an improvement upon the device as shown in Patent No. 1,173,567, issued to me February 29, 1916. The reversing mechanism employed is of the same general type as that shown in said patent. It employs two axially alined shafts having their ends somewhat separated and upon which adjacent ends are secured complemental cranks, which cranks are connected through the medium of a telescopic member mounted to slide upon a shaft which extends at right angles to the two shafts which are to be connected, and suitable clutch mechanisms whereby the casing in which the transverse shaft is mounted may be held against rotation or clamped to rotate with both of the cranks.

As herein shown, 1 and 10 represent the two axially alined shafts, one of which is the driving shaft and the other the driven shaft. Upon the adjacent ends of these shafts are secured the two crank members 3. The crank member 3 which is secured to the shaft 10 may be made integral therewith. The other crank member 3 which is secured to the shaft 1, is preferably secured thereto in a somewhat different manner, the object of this being to facilitate construction and assembly of the parts and also to facilitate access to the mechanism included within the casing. The shaft 1 has secured thereto a disk 33 and the latter is directly secured to the shaft 3, as by the use of bolts 34.

The casing which encloses the reversing mechanism has a barrel 2 and two heads 21 and 22 which are secured thereto, outside each of its respective crank 3. The head 21 has a flange 26 which enters into a groove formed between the head 33 and the outer portion of the crank 3, thereby holding these parts against separation in the direction of the length of the shaft and yet permitting free turning. It also has a flange 27 which extends over the outside periphery of the crank 3. This furnishes an additional rotative bearing surface between these parts. The other head, 22, has a sleeve 28 in which is provided the bearing surface for the shaft 10.

A shaft 4 is carried by the barrel 2 of the casing so as to intersect the extension of the axis of the two shafts 1 and 10, and approximately so as to bisect the extension of said axis. This may be conveniently secured in the casing by threading the ends thereof into a collar 44 which forms a nut and has a conical surface engaging with the complemental surface upon the casing so as to positively center and hold the two. Mounted upon the shaft 4 is a sleeve 40 so as to freely slide lengthwise of the shaft 4. This sleeve has two sockets extending at right angles to the shaft 4 and in which is mounted short shafts or slides 41. These are conveniently made of circular cross section, although this is not in any sense essential. The reception which these slides have in their sockets is comparatively short. The outer ends of each of these slides is provided with a head 42 of spheroidal shape. The cranks 3 are provided with complemental bearing members 30 and 31 having a bore therein, the inner surface of which forms a spheroidal cavity complemental to the heads 42. In this manner ball and socket joints are provided which will permit turning and rocking of the slides 41 in the socket of the crank.

The shaft 4, together with its slide and the ball and socket bearing connection between the two cranks 3, are in principle the same as the devices shown in my previous patent referred to. The above device is intended to be run in oil, that is, the casing is to contain a certain amount of oil so that all of the parts will become thoroughly oiled. However, unless special means are provided to secure such a result, the bearing surfaces between the rotative heads and the cranks may not be sufficiently lubricated. To secure efficient lubrication of these parts I provide each of the heads 21 and 22 with a hole 24 extending to the outer side face thereof. I also provide a groove as 23 extending as an annular ring and in communication with the hole 24.

A further bore or bores 25 may be provided extending from the ring groove 23 to certain of the surfaces which form the rotative bearing between the crank 3 and the head 21. Each of the slides 41, which have the globular head 42 thereon, is provided with an axial bore 43, and the slide 40 is provided with a bore 45 at each side of the shaft 4. This bore 45 is preferably located at such a point that it is uncovered when the slide 41 is at its extreme outer position and covered when the slides are at their extreme inner position.

In consequence of this construction the socket and the slide 41 act as an oil pump to pump oil through the bore 43 to the outer end of the slides 41, thereby discharging the same through the hole 24 and into the ring groove 23, thereby insuring lubrication of all of the rotative surfaces.

Each of the cranks 3 has a sleeve extending inwardly or towards each other and provided with a coned clutch surface 32. Two complemental clutch rings 5 are employed, each provided with a complemental coned friction surface, and these are mounted to turn with the casing, as by having outwardly projecting lugs 52 which engage complemental grooves or lugs carried by the casing 2. Springs 51, mounted in sockets in the casing, engage upon the outer faces of the rings 5 so as normally to force them towards each other, that is into position in which the frictional grip between the conical surfaces 32 will be relieved, thus eliminating the clutch action between said surfaces.

Journaled in the casing 2 parallel with the axis of the shafts 1 and 10, are two rods or friction controlling shafts 6. One end of each shaft projects through one head of the casing. Between the two rings 5 this shaft is provided with an enlargement 60 which extends between the two clutch rings 5. This enlargement or projection 60 and the inner faces of the clutch rings 5 have complemental cam surfaces which are of helical character and are adapted when the shaft 6 is turned in one direction to separate the clutch rings 5 and cause them to powerfully engage the conical clutch surfaces 32, thereby causing them to be gripped upon the cranks 3 and to cause the said cranks to turn together. When this is done the casing 2 also turns with the cranks. When the shaft 6 is turned in the opposite direction the clutches are released. When this is done a friction brake band 9, which surrounds the casing, is operated in such manner as to tightly clamp and hold the casing 2 against turning. When this occurs the reversing mechanism, consisting of the shaft 4 together with a slide 40 and the slides 41 carried thereby, cooperate to transmit motion between the shafts 1 and 10, but to reverse the direction of motion as between the shafts.

Each of the shafts 6 has secured to its outer projecting end a small crank arm 7. Pivotally mounted upon a pin 71 carried by the head 22 is another arm 70. These two arms are connected in such way that they are compelled to move together. The manner of connection illustrated consists of two lugs 72 carried by the arm 70 and between which extends a pin 75 carried by the arm 7. This permits free swinging action between two arms. The arm 70 has a foot 73 projecting laterally in position to be engaged by the conical end 87 of a sleeve 84 mounted upon the sleeve 28 of the head 22. The sleeve 84 has a groove therein in which is seated a ring or yoke 85 which has two lugs or pins 83 projecting therefrom at diametrically opposite points, which pins 83 are engaged by the yokes of two arms 80 and 81 mounted upon a shaft 8 which extends transversely of and beneath the power shaft 10. One of these arms, as the arm 81, has an upward extension 82 forming a lever for manual engagement in order to operate and control the reversing mechanism.

This lever is connected by a link 91 with a lever 90 pivotally mounted at one side of the casing and engaging one or both ends of the brake band 9 so as to apply and release the same. The connections are such that when the brake band 9 is applied the clutch rings 5 are released, and vice versa.

In order to adjust the action of the clutch controlling mechanisms more accurately, the foot 73 may be provided with a contact bolt 74 which directly engages the clutch actuating surface 87. The above device forms a reversing mechanism which may be applied to a shaft, which mechanism employs no gears and which is silent in its operation. When the two shaft sections which are connected thereby are turning in the same direction, all of the movable parts of the reversing mechanism are held in fixed relation to each other, so that there is no wear occurring. Reversing mechanisms, where employed, are usually employed on apparatus in which the reversing action takes place during only a small portion of the time, and therefore the action of the reversing mechanism will cause but little wear, as it is in use but a small portion of the time.

What I claim as my invention is:

1. A reversing gear comprising two axially separated cranks rotatable about a common axis, a shaft positioned to perpendicularly bisect the axis extensions between said cranks, a sleeve mounted to slide and rock upon said shaft and having guide sockets extending at right angles to the axis of said shaft and in opposite directions, plungers slidable in said sockets, said plungers and the cranks having ball-and-socket connections, and the plungers each having an axial bore whereby they may act as pumps for the circulation of oil to the bearing surfaces.

2. A reversing gear comprising two axially separated cranks rotatable about a common axis, a shaft positioned to perpendicularly bisect the axis extensions between said cranks, a casing enclosing said cranks to form an oil containing chamber, by which chamber the said shaft is carried, said chamber and the cranks having rotative bearing surfaces, a sleeve mounted to slide and rock upon said shaft and having guide sockets extending at right angles to the axis of said shaft and in opposite directions, plungers slidable in said sockets, said plungers and the cranks having ball-and-socket connections, and the plungers each having an axial bore whereby they may act as pumps for the circulation of oil to the bearing surfaces.

3. A reversing gear of the type herein described having a reciprocating plunger carrying one part of a ball-and-socket bearing, and a guide socket therefor, the plunger being provided with an oil bore extending lengthwise thereof, and the socket having an inlet port adapted to be covered by the plunger upon its inward stroke, whereby said plunger and socket may function as an oil circulating pump.

4. A reversing gear comprising two alined and separated shafts, a crank secured to the adjacent end of each shaft, a casing enclosing both cranks and having rotative bearings therewith forming closures for the casing, a transverse shaft carried by the casing and extending across the casing at right angles to the extended axis of the two crank shafts, a telescopic bar mounted to slide upon said transverse shaft, said telescopic bar and the cranks having ball-and-socket bearing connections and the telescopic members being bored to form oil circulating pumps, and the cranks each having a passage therethrough connecting its ball-and-socket bearing with the bearing surfaces between the cranks and the casing, and means for optionally binding the cranks and casing to turn together or to hold the casing against turning.

5. A reversing gear comprising two axially separated cranks mounted for independent rotation about a common axis and each having a clutch friction surface, a casing enclosing said cranks and having rotative bearing engagement therewith, two friction bands held against turning relative to the casing with the complemental friction surfaces of the cranks forming friction clutches, means for engaging and disengaging said clutch surfaces, a shaft carried by said casing and bisecting at right angles the axis extensions between said cranks, a sleeve mounted to slide and rock upon said shaft and having sockets extending oppositely from and at right angles to said shaft, a plunger mounted in each socket, the plungers and cranks having complemental members forming ball-and-socket bearings, the plungers having bores extending lengthwise thereof and the sockets, a port covered by the plunger in the inward portion of its stroke, whereby they may act as oil circulating pumps.

6. In a reversing device of the type described, a casing, two aligned shafts journaled therein, a crank secured upon each shaft, a friction clutch member rotative with each crank, complemental friction clutch members carried by and turning with the casing, an oscillable clutch controlling shaft journaled in the casing parallel with the axis of the crank shafts, said controlling shaft and the casing-carried clutch members having engageable cam surfaces acting when the shaft is turned to apply or release the clutch surfaces to thereby secure the locking of the cranks to the casing to turn therewith, and means for oscillating the clutch-controlling shaft.

7. The combination with a reversing mechanism as defined in claim 6, an arm secured upon the end of said clutch controlling shaft which is without the casing, a second arm pivoted upon the casing head and having a flexible actuating connection with the first named arm and also having an end adjacent to the shaft of one of the cranks, and an actuating cone mounted upon said shaft for movement axially of its shaft to engage said end.

8. A reversing gear of the type having two alined and separated shafts, a crank on the adjacent ends of each shaft, a casing rotatively mounted with relation to said shafts and cranks, a shaft carried by the casing and bisecting the axis of the cranks, a slide mounted upon said latter shaft and having guides extending oppositely from and at right angles to said shaft, slides mounted in said guides, said slides and the cranks having complemental ball-and-socket members engaging to connect the cranks, each crank having a rotative friction clutch surface, complemental friction clutch members mounted to rotate with the casing and grippingly engaged with and released from the crank-carried friction surfaces by opposite movements parallel with the axis of the shafts, a clutch-controlling shaft journalled in the casing parallel with the crank shaft axis, said clutch controlling shaft and the casing-carried friction members having engaging cam surfaces acting by turning of the shaft to apply and release the clutch, and a brake acting upon the casing to prevent its turning.

9. A reverse controlling means for reversing devices of the type described, comprising a casing, cranks journaled in the casing, clutch rings mounted in and turnable with the casing, complemental clutch members carried by the cranks, a shaft journaled in the casing parallel with the axis of the cranks, said shaft and the clutch rings having engaging cam surfaces acting when the shaft is turned to apply and release the complemental clutch members, an arm secured to the outwardly projecting end of said shaft, a second arm pivoted upon the casing head and having actuating engagement with the first arm and also having a foot adjacent to the shaft of one of the cranks, and a clutch operating cone mounted on said crank shaft and adapted to be engaged with said foot to force it outwardly.

10. A reversing gear comprising two axially separated cranks mounted for independent rotation about a common axis and having friction clutch surfaces, a casing enclosing said cranks and having rotating bearings thereon concentric with the same axis, a shaft carried by the casing and bisecting the axis of the crank shafts at right angles, a slide mounted to slide upon said casing-carried shaft and having guides at right angles to said shaft, slides mounted in said guides, said latter slides and the cranks having engaging complemental ball-and-socket members, two rings having friction clutch surfaces complemental to those upon the cranks and mounted to turn with the casing and to be moved into and out of engagement with the friction surfaces of the cranks, two rods journaled within the casing parallel to the crank axis and without the cranks and having, with the rings, interengaging cam surfaces adapted to control the application of the clutch members, rod-operating means comprising a crank secured to the end of the rod which is without the casing, an arm pivoted to the casing and having a sliding engagement with the said crank, and a cone sleeve surrounding one of the crank shafts and adapted to engage the said arm to swing it.

Signed at Seattle, King County, Washington, this 2d day of June, 1924.

RALPH GERBER.